Aug. 30, 1960  J. W. McDUFFIE  2,950,807
HAY BALER
Filed Oct. 25, 1957  4 Sheets-Sheet 1
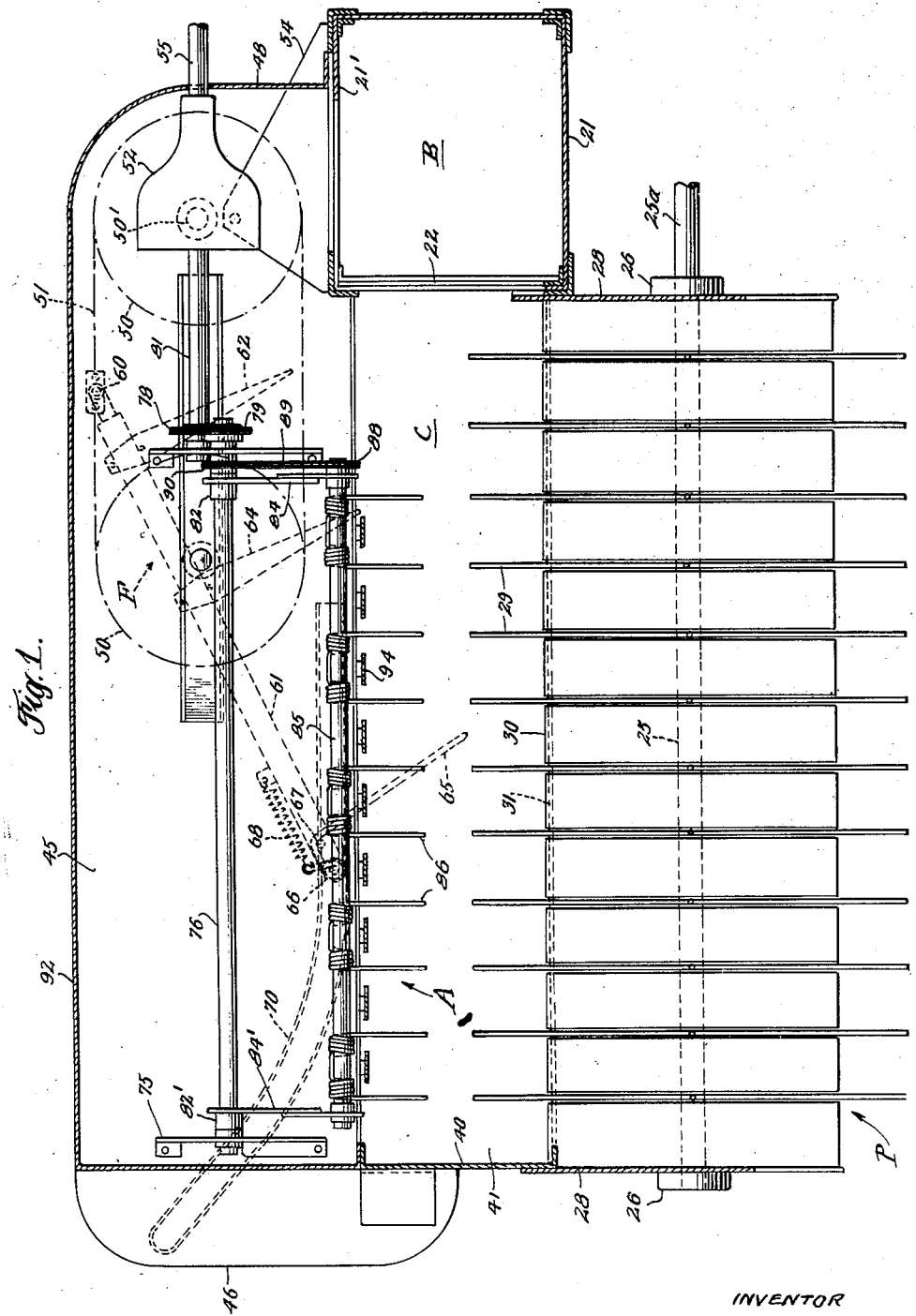
INVENTOR
JAMES W. McDUFFIE
Joseph Allen Brown
ATTORNEY

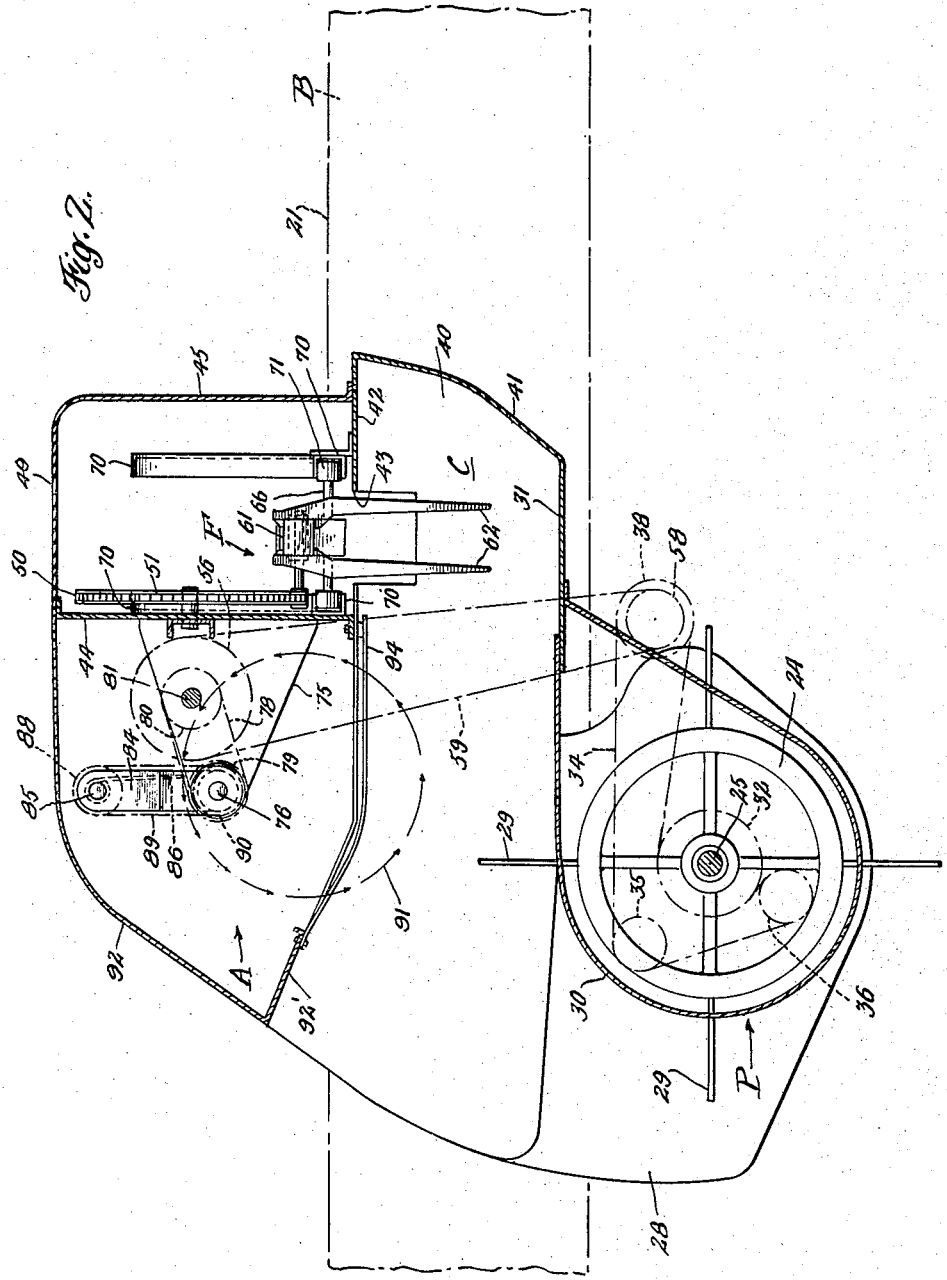

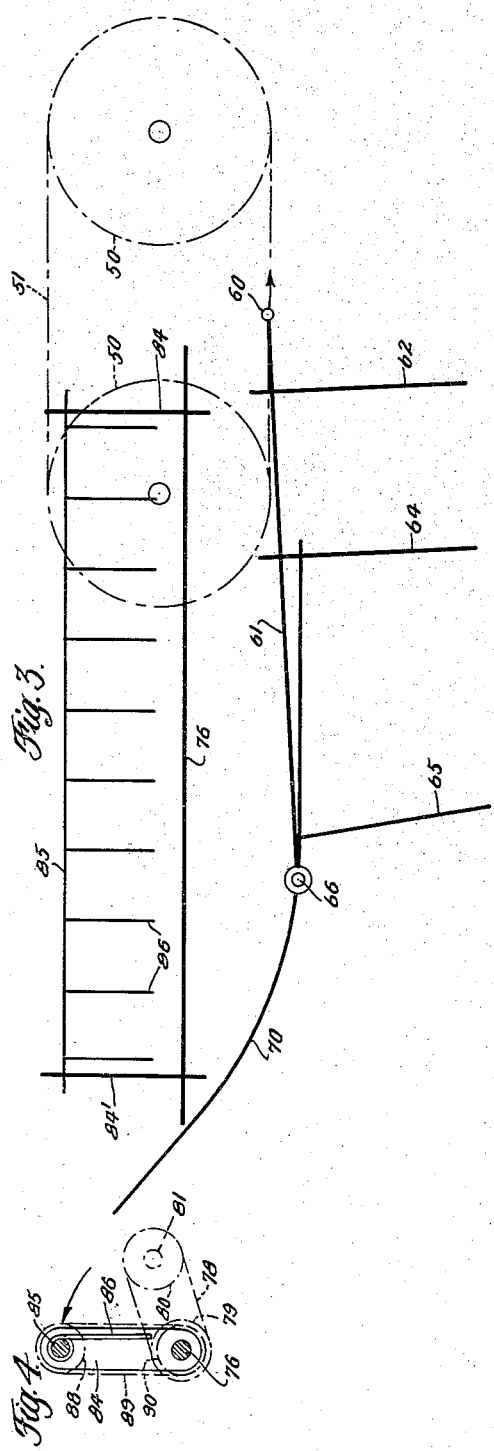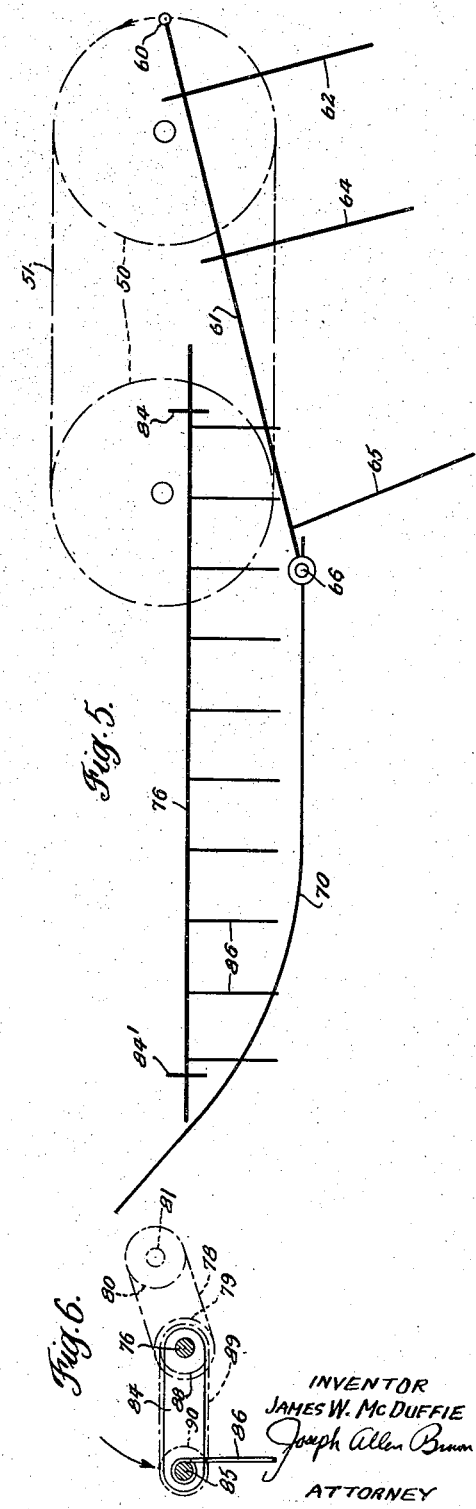

Aug. 30, 1960 J. W. McDUFFIE 2,950,807
HAY BALER
Filed Oct. 25, 1957 4 Sheets-Sheet 4

INVENTOR
JAMES W. McDUFFIE
Joseph Allen Brown
ATTORNEY

United States Patent Office 2,950,807
Patented Aug. 30, 1960

2,950,807

HAY BALER

James W. McDuffie, New Holland, Pa., assignor to Sperry Rand Corporation, New Holland, Pa., a corporation of Delaware Filed Oct. 25, 1957, Ser. No. 692,449

4 Claims. (Cl. 198—107)

This invention relates generally to automatic hay balers and more particularly to a device for assisting a pick-up mechanism in delivering cut crop material to a feeder mechanism. Still more specifically, the invention relates to an assist device for use in a baler similar to that shown in U.S. Patent No. 2,760,625, issued August 28, 1956, wherein reciprocable means is employed in feeding crop material to a fore-and-aft extending bale case.

The feeder mechanism shown in Patent No. 2,760,625 comprises a plurality of feed fingers. When conveying crop material toward the bale case of the baler, these fingers move relatively close to the hay receiving platform on which the crop material is deposited from the pick-up. On a return stroke, the fingers are relatively more vertically spaced from this platform. The platform is surrounded by a housing open at the front to permit free admission of material from the pick-up. This housing forms a feed chamber.

When balers of this type are operated at or near capacity, material will accumulate at the entrance of the feed chamber when the feeder mechanism is on a working stroke in the chamber. After the feeder mechanism has completed a working stroke and is returning outside the chamber, or at least spaced a greater distance from the feed platform, such accumulated material will move into the feed chamber. However, such material will tend to hesitate in so moving because the crop material will have become compacted somewhat while accumulating and because of the restricted opening in the front of the feed chamber.

The accumulation of material at the feed chamber opening is caused by the uniform or continuous supply of material from the pick-up and the non-uniform movement of such material from the feed chamber into the bale case.

A primary object of this invention is to provide means for assisting the pick-up in delivering crop material to the feed chamber, such means being operable between working strokes of the feeder mechanism and preventing accumulated crop material from hesitating before entering the feed chamber after the feeder mechanism has completed a working stroke.

Another object of this invention is to provide an assist mechanism which operates in timed relation with a feeder mechanism, operating to assist in delivering crop material to the feeder mechanism between working strokes thereof.

A further object of this invention is to provide an assist device of the character described which is of relatively simple construction thereby enabling it to be manufactured at low cost.

Other objects of this invention will be apparent hereinafter from the specification and from the recital in the appended claims.

In the drawings:

Fig. 1 is a transverse vertical section through a hay baler having an assist device constructed according to this invention;

Fig. 2 is a longitudinal vertical section through the baler, showing the assist device in a different operative position than that shown in Fig. 1;

Fig. 3 is a diagrammatic view showing the feeder mechanism of the baler during a working stroke and the corresponding position of the assist device, these positions corresponding to the showing in Fig. 2;

Fig. 5 is a view similar to Fig. 3 showing a feeder mechanism completing a working stroke and the assist device about to begin a working stroke;

Figure 7:
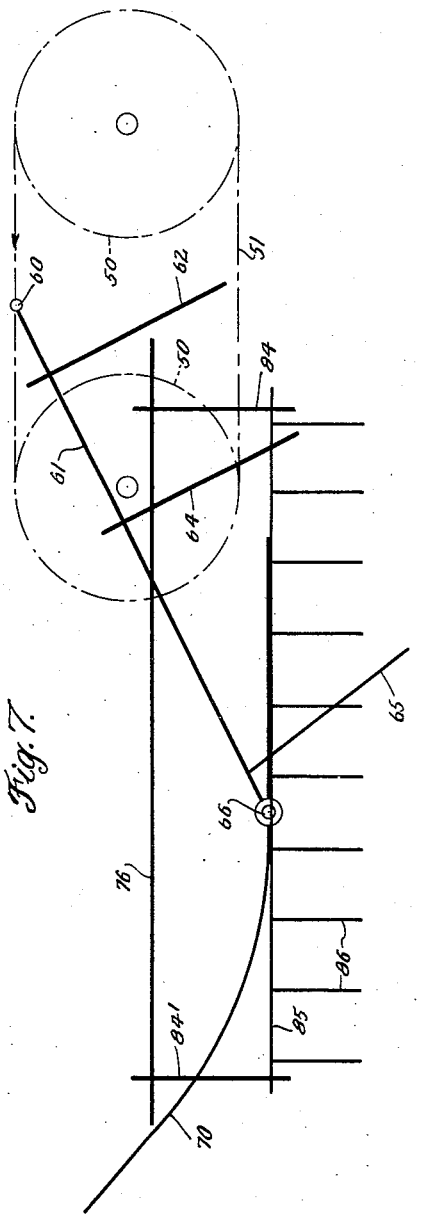
Fig. 7 is a view similar to Figs. 3 and 5 showing the feeder mechanism during a return stroke and the assist device in a working stroke, these positions corresponding to the showing in Fig. 1.
Figure 9:
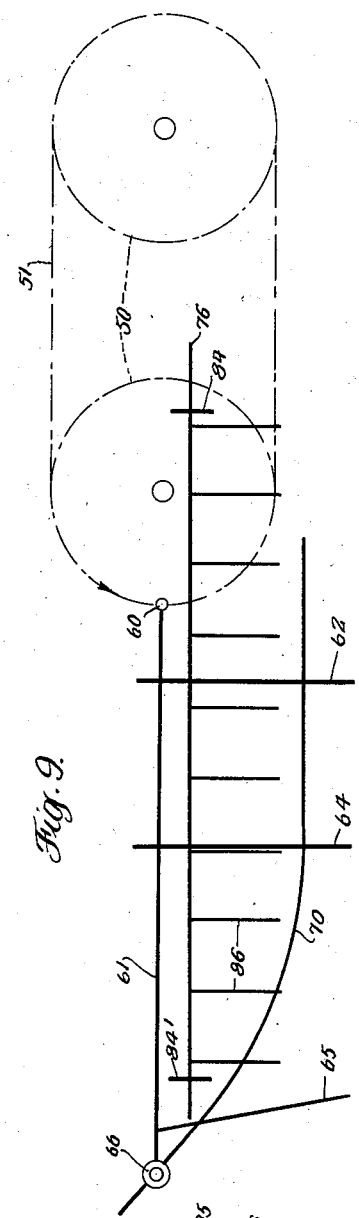
Figures 8, 10:
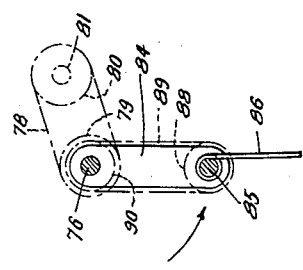

Fig. 9 is a view similar to Figs. 3, 5 and 7 showing the feeder mechanism about to commence a working stroke and the assist device just after it has completed a working stroke; and Figs. 4, 6, 8 and 10 are generally diagrammatic sections showing the assist device in the positions of Figs. 3, 5, 7 and 9, respectively, the movement of the device being indicated by the arrows.

Referring now to the drawings by numerals of reference, and particularly to Figs. 1 and 2, there is illustrated a bale case B, a pick-up mechanism P, a chamber for the reception of picked up crop material C, a feeder mechanism F, and the assist device of this invention A. Such structure is mounted on a wheeled frame, such as shown in U.S. Patent No. 2,760,625, for movement across a field of cut and windrowed crop material. The baler when viewed as shown in Fig. 2 moves towards the left, the pick-up P elevating material and delivering it rearwardly to the chamber C. From there the material is moved laterally and into the bale case B by the feeder mechanism F. Delivery of hay to the chamber C is aided by the assist device A.

Bale case B comprises an elongate fore-and-aft extending box-like structure 21 which is rectangular in cross section. The vertical side wall of the feed chamber facing chamber C has an opening 22 through which crop material may be fed. A plunger, not shown, is reciprocable in the bale case to compress the hay delivered thereto into bales. After each bale is completed, it is automatically tied by any suitable, conventional tying mechanism and then dropped from the rear end of the baler and onto the ground or into a trailing wagon.

The pick-up P comprises a reel 24 rotatable on a shaft 25 the axis of which is transverse to the longitudinal axis of the bale case. Shaft 25 is journaled in bearings 26—26 carried on a pair of spaced side walls 28—28. The reel has a plurality of outwardly projecting tines 29 which project between a plurality of arcuate stripper plates 30.

Crop material elevated by the tines 29 is moved over plates 30 and delivered rearwardly to a hay receiving feed platform 31. Such platform extends transversely from the bale case in horizontal plane contiguous with the lower end of opening 22.

Reel 24 is rotated by a sprocket 32 keyed to one end 25a of shaft 25. Sprocket 32 is driven by an endless chain 34 trained around idler sprockets 35 and 36 and a drive sprocket 38.

Disposed around platform 31 is a housing having a side wall 40, a rear wall 41 and a slotted top wall 42, such slot being denoted 43. This housing forms the chamber C for the reception of the material from the pick-up. Mounted on top wall 42 is a feeder mechanism housing comprising a front wall 44, a rear wall 45, side walls 46 and 48 and a top wall 49. Connected to front wall 44 is a pair of sprockets 50—50, one of which is disposed over the bale case B and the other over platform 31 (Fig. 1). Both sprockets are rotatable in a plane transverse to the fore-and-aft extension of the bale case. Trained around these sprockets is an endless chain 51. Chain 51 is rotated constantly, in a counter-clockwise direction when viewed as shown in Fig. 1, from a gear box 52 supported on upstanding brackets 54 welded or otherwise fastened to top wall 21' of the bale case B. The gear box receives power from a shaft 55 having a sprocket 56 (Fig. 2) keyed to it. Sprocket 56 is driven from a power source, not shown, such as the power plant of the tractor used in towing the baler; or, the baler can be powered with a separate engine for operating the various mechanisms of the baler. Gear box 52 is connected to the sprocket 50 over the bale case through a shaft 50' and suitable conventional bevel gearing, not shown.

Trained around sprocket 56 and around a sprocket 58 on drive sprocket 38 is an endless chain 59. Through chain 59 the sprocket 38 and the pick-up are driven.

Pivotally connected to endless chain 51 at 60 is a bar or support 61 having three sets of fingers spaced in a direction away from the bale case namely, leading fingers 62, middle fingers 64 and trailing fingers 65. Fingers 62 and 64 are suitably fastened to bar 61 to extend in a fixed direction relative thereto. However, the rear fingers 65 are pivotal relative to the bar. They are supported on a cross shaft 66 which extends through opposite sides of the bar. When bar 61 is moved from right to left (Fig. 1), if the fingers 65 engage any material on the platform 31, they may swing upwardly. Such upward swinging is restricted or resisted by a spring 68. Swinging movement in the opposite direction is limited by stop pin 67.

The end of bar 61 remote from the bale case is supported on a pair of spaced parallel cam tracks 70. Each end of the cross shaft 66 has a roller 71 movable over one of the tracks. Each cam track extends horizontally, then curves upwardly and outwardly from the bale case. When rollers 71 move up the curved section of the track, the feed mechanism is elevated relative to the platform 31. In like respect, when bar 61 moves toward the bale case, rollers 71 move down the track and the feeder mechanism is lowered.

Fastened to the front face of wall 44, and extending forwardly relative to the wall, are a pair of relatively spaced support brackets 75 which carry the assist device A of this invention. Journaled in the front ends of the brackets 75 is a shaft 76 the axis of which is parallel to the axis of rotation of the pick-up P, and to the direction of reciprocation of the feeder F. Shaft 76 is driven by an endless chain 78 trained around a sprocket 79 keyed to shaft 76 and a sprocket 80 keyed to a shaft 81 driven from gear box 52.

Connected to shaft 76 at 82—82' are a pair of radial support arms 84—84' the outer ends of which rotatably support a shaft 85. Shaft 85 has a plurality of sets of rake tines 86 connected to it. The end of shaft 85 projecting through arm 84 has a sprocket 88 which is connected by an endless chain 89 to a sprocket 90 (Fig. 1) on shaft 76. When shaft 76 is rotated by chain 78, sprocket 90 rotates with it and through chain 89 rotates sprocket 88 and shaft 85. These sprockets and chains are such that the extension of tines 86 is varied in accordance with the rotation of shaft 76 and the extension of arms 84—84' whereby the free ends of the tines 86 travel in a path indicated by the arrows 91 in Fig. 2.

Overlying the feeder assist is a roof 92 which extends forwardly from the top 49 of the feeder housing, then downwardly. The lower front end of roof 92 has a rearwardly extending section 92'. Connected to section 92' and extending downwardly and then rearwardly to the lower front end of the front wall 44 of the feeder housing are a plurality of plates 94 which extend between the rake tines 86 in crop stripping relation relative thereof.

Operation

In operation, the baler is towed across a field of cut and windrowed hay. The pick-up P engages such hay, elevates it and delivers the material rearwardly in a continuous stream toward the feed chamber C. The rotation of the chain 51 causes the feeder mechanism F to reciprocate back and forth. When the feeder begins a working stroke, the feed fingers are disposed as shown in Fig. 9, that is, the support bar 61 is moving downwardly toward the feed platform 31. The connection at 60 of the bar 61 with chain 51 is passing around the sprocket 50 over platform 31. From the position shown in Fig. 9, the feeder moves on a working stroke as shown in Fig. 3, the crop material resting on the feed platform being conveyed through the opening 22 and into the bale case B. The leading feed fingers 62, at least, move into the bale chamber through opening 22 and are extracted upwardly through the slotted roof 21'. The feeder mechanism is shown in Fig. 5 completing a working stroke. Thereafter, the feeder mechanism returns back towards the position shown in Fig. 9. This return is illustrated in Fig. 7. It will be noted that the leading and middle set of fingers are generally above the top 42 of the chamber C. The trailing set of fingers 65 are below this top wall. However, since they are pivotally mounted, if this trailing set of fingers engages any material on the platform 31 they will pivot upwardly and pass over such material. When the rollers 71 reach and move upwardly on the curved portion of track 70 the entire bar 61 will lift upwardly and the feeder will assume the position shown in Fig. 9. This operating sequence of the feeder mechanism will be repeated over and over.

The feeding mechanism F operates in timed relation with the reciprocable plunger in the bale case B. The feed fingers enter and leave the bale case between compressing strokes of the bale plunger.

While the feeder mechanism F operates intermittently, the pick-up P operates constantly to continuously pick up material and deliver it toward the chamber C. When the feeder mechanism is disposed as shown in Fig. 3, with the feed fingers projecting down into the chamber C and obstructing the free entry of material into the chamber, there is a tendency for the material being delivered rearwardly by the pick-up to accumulate in front of the chamber. When a feeding stroke has been completed, the accumulated material may move into the chamber C. However, as previously stated there is a tendency for the material to hesitate. The feeder assist A of this invention eliminates such hesitation.

When the feeder mechanism F is on a working stroke, Fig. 3, the rake tines 86 of the feeder assist are disposed above the stripper members 94 (Fig. 4). As the feeder mechanism is completing a working stroke, Fig. 5, the feeder assist begins to move towards operative position (Fig. 6). When the feeder mechanism is returning as shown in Fig. 7, the rake tines 86 move down below the stripper members 94 and sweep hay accumulated above the pick-up in a downward and rearward direction following the path 91. Just before the feeder mechanism starts on its next working stroke, Fig. 9, the rake tines sweep in a rearward and upward direction to push any accumulated material into the chamber C. As a result, when the feeder mechanism moves on its next working stroke, a large supply of material will be in the chamber C ready for delivery through the opening 22 and into the bale case B.

Thus, it will be seen that the pick-up operates constantly. The feeder mechanism F operates intermittently, and in timed relation with the plunger in the bale case B. The feeder assist operates in timed relation with the feeder mechanism F, delivering material to the chamber C between working strokes of the feed mechanism.

The feeder assist prevents any accumulation of material in front of the chamber C when the baler is operated at high speed. It insures a positive movement of material into the chamber C at the proper time and thereby provides means whereby the productive capacity of the baler is greatly increased.

The rake tines 86 are resilient. If any tine encounters an obstacle as it sweeps below the stripper plates 94, it will bend rearwardly and pass over such obstacle. The various rake tines may spring rearwardly independently. Therefore, those fingers which do not engage obstacles on a working stroke will operate in their usual path of rotation.

While sprockets 88 and 90 and the chain 89 provide a simple means for controlling the extension of the rake fingers suitable cams or other means might be employed.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention what I claim is:

1. An automatic hay baler comprising a fore-and-aft extending bale chamber having a feed opening in a vertical side wall thereof, a generally horizontal hay receiving platform extending laterally from adjacent the lower end of said opening, a feeder reciprocable over substantially the full length of said platform for conveying crop material through said opening and into said bale chamber, means connected to said feeder for positioning the feeder relatively close to said platform when it is moving toward said bale chamber on a working stroke and vertically spaced therefrom when it is moving away from said bale chamber on a return stroke whereby a relatively open space is provided above said platform when the feeder is returning, rotatable means mounted above said platform and forwardly of said feeder for engaging crop material from above and delivering it rearwardly for conveyance by said feeder, said rotatable means traversing a substantial portion of said platform and comprising a plurality of fingers relatively spaced in a direction away from said vertical side wall of said bale chamber and means for operating said rotatable means and said feeder in timed relation whereby said fingers deliver crop material rearwardly between successive working strokes of the feeder.

2. An automatic hay baler comprising a fore-and-aft extending bale chamber having a feed opening in a vertical side wall thereof, a generally horizontal hay receiving platform extending laterally from adjacent the lower end of said opening, a feeder reciprocable over substantially the full length of said platform for conveying crop material through said opening and into said bale chamber, means connected to said feeder for positioning the feeder relatively close to said platform when it is moving toward said bale chamber on a working stroke and vertically spaced therefrom when it is moving away from said bale chamber on a return stroke whereby a relatively open space is provided above said platform when the feeder is returning, rotatable means mounted above said platform and forwardly of said feeder for engaging crop material from above and delivering it rearwardly for conveyance by said feeder, said rotatable means comprising a shaft having an axial length which traverses a major portion of said platform, means mounting said shaft for rotation on an axis transverse to the longitudinal axis of said bale chamber, radial arms fixedly carried on said shaft, said arms having outer ends, a support rod mounted on said outer ends and extending parallel to said shaft, a plurality of fingers carried in relatively spaced relation on said rod, and means for rotating said shaft in timed relation with the reciprocations of said feeder whereby said fingers deliver material rearwardly between successive working strokes of the feeder.

3. An automatic hay baler comprising a fore-and-aft extending bale chamber having a feed opening in a vertical side wall thereof, a generally horizontal hay receiving platform extending laterally from adjacent the lower end of said opening, a feeder reciprocable over substantially the full length of said platform for conveying crop material through said opening and into said bale chamber, means connected to said feeder for positioning the feeder relatively close to said platform when it is moving toward said bale chamber on a working stroke and vertically spaced therefrom when it is moving away from said bale chamber on a return stroke whereby a relatively open space is provided above said platform when the feeder is returning, rotatable means mounted over said platform and forwardly of said feeder for engaging crop material from above and delivering it rearwardly for conveyance by said feeder, said rotatable means comprising a shaft, means mounting said shaft for rotation on an axis transverse to the longitudinal axis of said bale chamber, radial arms fixedly carried on said shaft, said arms having outer ends, a support rod mounted on said outer ends and extending parallel to said shaft, a plurality of fingers carried in spaced relation on said rod, means for rotating said shaft whereby said fingers are moved downwardly, rearwardly, upwardly, then forwardly, a plurality of elongate members extending in a fore-and-aft direction beneath said shaft and the path of movement of said rod, means mounting said members in crop stripping relation to said fingers, said fingers extending below said members when moving rearwardly and above the members when moving forwardly, and means for rotating said shaft in timed relation with the reciprocations of said feeder whereby said fingers deliver crop material rearwardly between successive working strokes of the feeder.

4. An automatic hay baler comprising a fore-and-aft extending bale chamber having a feed opening in a vertical side wall thereof, a generally horizontal hay receiving platform extending laterally from adjacent the lower end of said opening, a feeder reciprocable over substantially the full length of said platform for conveying crop material through said opening and into said bale chamber, means connected to said feeder for positioning the feeder relatively close to said platform when it is moving toward said bale chamber on a working stroke and vertically spaced therefrom when it is moving away from said bale chamber on a return stroke whereby a relatively open space is provided above said platform when the feeder is returning, rotatable means mounted over said platform and forwardly of said feeder for engaging crop material from above and delivering it rearwardly for conveyance by said feeder, said rotatable means comprising a shaft, means mounting said shaft on an axis transverse to the longitudinal axis of said bale chamber, radial arms fixedly carried on said shaft, said arms having outer ends, a support rod mounted on said outer ends and extending parallel to said shaft, a plurality of fingers carried in relatively spaced relation on said rod, means for rotating said shaft whereby said fingers move downwardly, rearwardly, upwardly, then forwardly, a plurality of elongate members extending in a fore-and-aft direction beneath said shaft and the path of movement of said rod, means mounting said members in crop stripping relation to said fingers, said fingers extending below said members when moving rearwardly and above the members when moving forwardly, means for altering the extension of said fingers relative to said shaft as the shaft rotates, and means for rotating said shaft in timed relation with the reciprocations of said feeder whereby crop material is delivered rearwardly between successive working strokes of said feeder.

References Cited in the file of this patent

UNITED STATES PATENTS

| | | |
|---|---|---|
| 2,499,615 | Tuft | Mar. 7, 1950 |
| 2,572,180 | Morrison | Oct. 23, 1951 |
| 2,729,047 | Cheatum | Jan. 3, 1956 |
| 2,760,625 | Lohnert | Aug. 28, 1956 |
| 2,775,339 | Cadier | Dec. 25, 1956 |

FOREIGN PATENTS

| | | |
|---|---|---|
| 153,042 | Australia | Sept. 1, 1953 |
| 1,126,672 | France | July 30, 1956 |